US009401758B2

(12) United States Patent
Bosworth

(10) Patent No.: US 9,401,758 B2
(45) Date of Patent: Jul. 26, 2016

(54) UNMANNED AIR VEHICLE WITH AUTONOMOUS AIR TRAFFIC CONTROL COMMUNICATIONS CAPABILITY

(71) Applicant: Northrop Grumman Systems Corporation, Falls Church, VA (US)

(72) Inventor: Craig S. Bosworth, San Diego, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 14/306,344

(22) Filed: Jun. 17, 2014

(65) Prior Publication Data

US 2015/0365159 A1  Dec. 17, 2015

(51) Int. Cl.
| G05D 1/00 | (2006.01) |
| G10L 15/00 | (2013.01) |
| H04B 7/185 | (2006.01) |
| G08G 5/00 | (2006.01) |
| G10L 15/26 | (2006.01) |

(52) U.S. Cl.
CPC .......... *H04B 7/18508* (2013.01); *G08G 5/0013* (2013.01); *G08G 5/0056* (2013.01); *G08G 5/0069* (2013.01); *H04B 7/18502* (2013.01); *H04B 7/18504* (2013.01); *G05D 1/0016* (2013.01); *G10L 15/26* (2013.01)

(58) Field of Classification Search
CPC ....... G05D 1/0061; G05D 1/00; G08C 17/02; G08C 2201/91; B60L 2260/32; B64C 19/00; B64C 39/024; G08G 5/0013; G08G 5/0069
See application file for complete search history.

(56) References Cited

U.S. PATENT DOCUMENTS

| 7,174,300 B2 | 2/2007 | Bush | |
| 8,515,593 B2* | 8/2013 | Marty | G05D 1/0022 701/11 |
| 8,751,061 B2* | 6/2014 | Coulmeau | G08G 5/0013 701/2 |
| 2008/0065275 A1* | 3/2008 | Vizzini | 701/2 |
| 2011/0245997 A1* | 10/2011 | Marty | G05D 1/0022 701/2 |
| 2011/0257813 A1* | 10/2011 | Coulmeau et al. | 701/2 |
| 2014/0018979 A1* | 1/2014 | Goossen | G08G 5/0034 701/3 |
| 2015/0339933 A1* | 11/2015 | Batla | G08G 5/0069 701/120 |

* cited by examiner

*Primary Examiner* — Jerrah Edwards
*Assistant Examiner* — Demetra Smith-Stewart
(74) *Attorney, Agent, or Firm* — Patti & Malvone Law Group, LLC

(57) ABSTRACT

An exemplary method is implemented by an unmanned air vehicle (UAV) for providing voice communications to an air traffic control (ATC) station. Two-way first voice communications are supported with a human operator at a control station that is in control of the UAV over a digital radio frequency (RF) link. Two-way second voice communications are supported with a controller at the ATC station over an analog RF link. The first and second voice communications are coupled to each other so that two-way voice communications are provided between the human operator and the controller. A determination is made that the first communications with the human operator is not operative. Based on this determination, autonomous voice announcements of flight parameters of the UAV are generated, and transmitted via the analog radio frequency link to the ATC station.

17 Claims, 3 Drawing Sheets

UNMANNED AIR VEHICLE WITH AUTONOMOUS AIR TRAFFIC CONTROL COMMUNICATIONS CAPABILITY

BACKGROUND

This invention relates to unmanned air vehicles (UAVs) and more particularly to communications with air traffic control (ATC) stations involving UAVs.

There is an increasing usage of UAVs for a variety of applications, especially in airspace regulated by ATC. In the United States, the Federal Aviation Administration has standards for the safe operation of aircraft. Communications between ATC stations and aircraft plays a critical role in maintaining a safe environment for both aircraft and people aboard aircraft especially in regions where multiple aircraft are flying in proximity to one another. ATC systems normally rely on two-way analog radio frequency (RF) voice communications with aircraft operating in a region controlled by a particular ATC. In addition to voice communications, aircraft are normally required to have a transponder which transmits limited one-way communications identifying the aircraft to the ATC and certain other information.

During normal operation of a UAV, a remote human operator who may typically be based at an earth station is responsible for the operation and control of the UAV. Command and operational status information are transmitted between the remote human operator and the UAV by a two-way digital RF communication link, which may utilize other in-flight aircraft or satellites as communication repeaters between the UAV and an earth station where the human operator is located. In addition to supporting two-way digital communications, the UAV includes an RF transceiver which supports analog RF voice communications with ATC systems. The digital communication link between the UAV and human operator includes voice communication support so that a two-way voice communication path between an air traffic controller and the human operator is supported. Thus, the air traffic controller, from his point of view, is in normal voice communications with the "pilot" of the UAV just as in communicating with the pilot of a manned airplane. That is, the air traffic controller can give voice instructions to control the flight parameters, e.g. heading, altitude, speed, etc., of the UAV which will be heard by the remote human operator and acknowledged by a reply voice communication just like a pilot of a manned aircraft. Likewise, the human operator can initiate voice communications with the air traffic controller seeking permission for a change of the flight parameters of the UAV. Of course, such communications between the air traffic controller and the human operator requires the existence of the digital voice communication channel between the human operator and the UAV. Should the digital communication link (including command and control) between the human operator and the UAV fail, or just voice communication with the remote human operator fail, then two-way voice communications utilized by the air traffic controller for communications with the operator of the UAV will also fail. In the event of such a failure, the human operator may place a conventional landline telephone call from his earth station location to the subject air traffic controller in order to establish two-way communications via landline telephone with regard to the operation of the UAV. From an air traffic controller point of view, such a landline communication is substantially more difficult, includes at least an initial interval of time during which two-way voice communications are not available during the failure of the normal path, and, in general, is disruptive to the air traffic controller's attention required for the control of multiple aircraft under his supervision since landline usage is more burdensome.

It should be noted that the UAV normally stores in memory one or more default courses of action (alternate mission plans) that are automatically initiated upon the loss of digital communications with the human operator. For example, the UAV may be programmed to utilize stored data such as the location of its home base, landing field information and a series of actions to take in the event of loss of the digital communication link. Other information acquired directly by the UAV is of course available to the UAV such as its location based on GPS and operational flight parameters. This facilitates the capability of the UAV to autonomously fly itself back to its home base and land in the event of the loss of digital communications with the human operator. Alternatively, the UAV may follow any predetermined mission plan stored in memory. Should the digital communications link between human operator and the UAV become operative again, the human operator may issue a command to regain control of the UAV and abort the automated default actions.

SUMMARY

It is an object of the present invention to support autonomous one-way voice communications from a UAV to the ATC station in the event of the loss of communications between the UAV and the human operator of the UAV.

An exemplary method is implemented by a UAV for providing voice communications to an ATC station. Two-way first voice communications are supported with a human operator at a control station that is in control of the UAV over a digital RF link. Two-way second voice communications are supported with a controller at the ATC station over an analog RF link. The first and second voice communications are coupled to each other so that two-way voice communications are provided between the human operator and the controller. A determination is made by the UAV that the first communications with the human operator is not operative. Based on this determination, autonomous voice announcements of flight parameters of the UAV are generated by the UAV, and transmitted via the analog radio frequency link to the ATC station.

A computer program product residing on a tangible non-transitory medium having a computer readable program code embodied therein for execution by a computer in a UAV to implement a method for providing voice communications to an ATC station is another embodiment of the present invention.

A further embodiment of the present invention resides in the apparatus of the UAV that implements the above described method.

DESCRIPTION OF THE DRAWINGS

Features of exemplary implementations of the invention will become apparent from the description, the claims, and the accompanying drawings in which:

DETAILED DESCRIPTION

Figure 1:
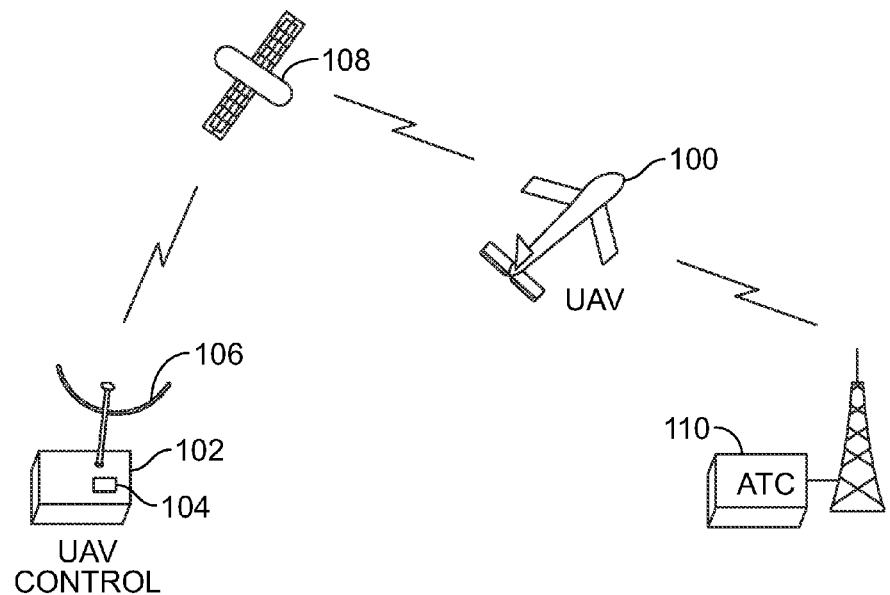
FIG. 1 shows a UAV in an exemplary operational environment.

In FIG. 1, an exemplary system is shown in which a UAV 100 is in-flight and under the control of a human operator located at the earth control center 102. A computer supported control station 104 in the control center 102 is utilized by the human operator to enter commands for the UAV 100 and displays operational status information from the UAV. The control station 104 includes an RF digital transceiver coupled to antenna 106 for the transmission and reception of digital communications. A digital RF communication link between control station 104 and the UAV 100 is supported in the illustrative example by a communication satellite 108 which serves as a repeater to transmit signals received from the control center 102 to UAV 100 and to transmit signals received from the UAV 100 to the control center 102. The UAV 100 also supports an analog RF communication link with the ATC center 110.

Two-way voice communications between an air traffic controller at ATC 110 and the human operator at control center 102 is supported as will be explained in more detail with regard to FIG. 2. Such communications between the ATC controller and the human operator requires that the digital communication link between the UAV 100 and the control center 102 be operational. More specifically, that portion of the digital communication link between the UAV 100 and the control center 102 that supports voice communications must be operational, i.e. capable of supporting the transmission of two-way voice information. One scenario is that there is a loss of all digital communications between the UAV 100 and the control center 102, which would of course include the loss of the associated voice communication path. However, it is possible that a component at the UAV 100 or the control station 104 only utilized for the support of voice communications over the digital RF link could fail causing the failure of the two-way digital voice communication link between the control station 104 and UAV 100 while other command functions associated with the digital communication link remain operative. Of course, if the analog RF voice link between the UAV 100 and ATC 110 fails, then there will be no RF voice communications with ATC even if the digital RF link between the UAV 100 and control station 104 is operative. A transponder aboard the UAV may transmit ("squawk") the assigned UAV identification and its altitude, as specified by its operator. In a situation where the UAV 100 is not in voice communication with the ATC 110, the transponder would typically be changed to squawk "7600", a predefined code that indicates the aircraft is without ATC radio communications. This at least provides the controlling ATC with information that radio communications is not available so that measures involving other aircraft with radio communications can be taken.

Figure 2:
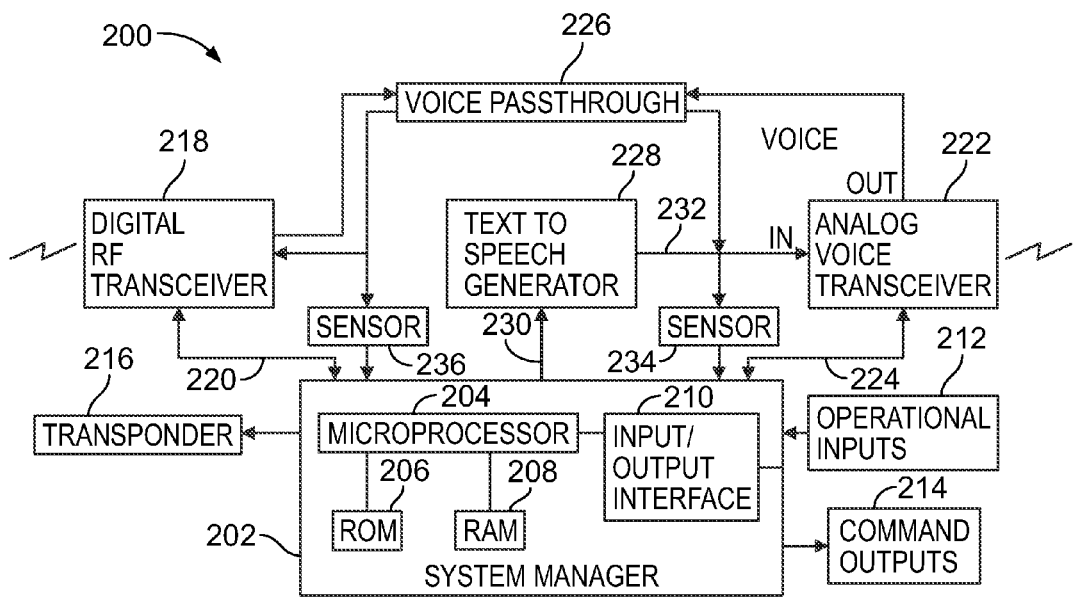
FIG. 2 is a block diagram of an exemplary UAV in accordance with an embodiment of the present invention.

FIG. 2 is a block diagram of exemplary components 200 of the UAV 100. The illustrated components represent those more relevant to the embodiment of the present invention. It will be apparent that other known components are not shown for clarity and an easier understanding of the embodiment of the present invention. A system manager 202 provides overall operation and control of the UAV and would typically include a microprocessor 204, read-only memory (ROM) 206, random access memory (RAM) 208 and an input/output interface module 210. The ROM 206 provides nonvolatile memory storage for data and operating instructions for the microprocessor 204 including a UAV to ATC communication program that provides autonomous communications from the UAV to the ATC. As used herein "autonomous" means independent, not subject to outside control. The RAM 208 provides volatile memory storage utilized during the operation of the microprocessor 204 and may contain operating instructions transferred from ROM 206 for quicker access by the microprocessor as well as storage of variables and/or data. The input/output interface module 210 provides a data communication interface between the microprocessor 204 and other components. As will be understood, the microprocessor 204 operates under the control of program instructions stored in memory which controls all aspects of the operation and functioning of the UAV, either autonomously based on a preprogrammed series of actions to be taken, based upon the receipt of instructions received from the human operator, or the combination thereof. Operational inputs 212 provide information, e.g. data from sensors and other modules such as a GPS receiver (not shown), to the system manager 202. Command outputs 214 represent instructions and data transmitted from the system manager 202 to sensors and modules of the UAV 100, such as flight controls, propulsion, landing gear, etc. (not shown). The transponder 216 operates in a known manner to transmit the UAV 100 identification and appropriate codes related to air traffic control both while voice communications with the ATC 110 are and are not available.

A digital RF transceiver 218 supports the transmission and reception of digital data, including digitized voice, between the UAV 100 and the earth control center 102. A digital communication channel 220 between the transceiver 218 and the system manager 202 supports instructions and commands transmitted from the system manager 202 and the transfer of recovered digital information and status information from the transceiver 218 to the system manager 202. An analog voice transceiver 222 supports two-way analog voice communications between the UAV 100 and ATC 110 by RF communications. A digital communication channel 224 between the transceiver 222 and the system manager 202 supports instructions and commands transmitted from the system manager 202 to the transceiver 222 and status information transmitted by the transceiver 222 to the system manager 202. A voice pass through gate 226 provides a signal interface for voice information between the digital transceiver 218 and the analog transceiver 222. The voice of the human operator as received over the digital communication path and recovered by transceiver 218 is coupled through the voice pass through 224 to a voice input of analog transceiver 222 which transmits the voice information to the ATC 110. The voice of the ATC controller as received over the analog communication path and recovered by transceiver 222 is coupled through the voice pass through 226 to a voice input of digital transceiver 218 which transmits the voice information to the human operator at earth station 102. The pass through 226 may comprise two transmission gates which connect the voice outputs of the transceivers to the respective voice inputs of the other transceiver. Depending on the format of the voice information as recovered by the transceivers 218 and 222, the voice pass through 226 may also include analog-to-digital and digital-to-analog convertors in order to provide a compatible signal format to the input of the transceiver that will be retransmitting the voice information.

In accordance with an embodiment of the present invention, UAV 100 can provide autonomous one-way voice communications to the ATC 110 upon determining that communications between the human operator and the UAV is not operable. A text-to-speech generator 228 receives text, e.g. words such as in the form of ASCII characters, over line 230 from the system manager 202 and converts the received text into words with analog speech waveforms transmitted by line 232 to the voice input of analog RF transceiver 222 for transmission to the ATC 110. A plurality of words and phrases useful for conveying information to the ATC are stored in memory of the system manager 202. The following words and/or phrases provide an illustrative sample of words which may be arranged in a sequence (sentence) to provide relevant information to the ATC: zero, one, . . . nine, thousand, hundred, identification code of the UAV, altitude, feet, hours, minutes, North, South, East, West, descending, ascending, leaving, entering, will be, is, begin, in, continue, expected, arrival, turning, right, left, name of the home base of the UAV, "transmitting in the blind", "this UAV has lost link with its ground control station and is unable to comply with ATC direction", ATC, frequency, megahertz, "continue on course", "change course to", etc. A series of illustrative one-way communications transmitted autonomously by the UAV is provided below.

In the illustrative embodiment the text-to-speech generator 228 is utilized to convert text/characters into analog speech. In an alternative implementation, the system manager 202 directly provides digitized speech as an input to a digital-to-analog converter (not shown) with the output of the latter connected to the analog voice input of the analog RF transceiver 222. The advantage of this alternative embodiment is that the text-to-speech generator is not required. However, such an implementation places an increased computational processing demand on the microprocessor 204 as it would be required to stream the digitized speech as a substantially continuous flow during times of transmission by the analog voice transceiver 222. Unless a digital vocalization format of words suitable for direct input to a digital-to-analog converter are stored in memory of the system manager, the microprocessor would also be required to convert the stored words, such as stored ASCII characters in memory, into a suitable form of digitized speech for input to the digital-to-analog converter. That is, the microprocessor would be required to convert the text version of words into a corresponding voiced version of the words in a digital format suitable for input to the digital to analog converter. The choice of whether to use the text-to-speech generator 228 which effectively off loads processing burden from the microprocessor 204 or to utilize the microprocessor with only the assistance of a digital-to-analog converter to produce the required analog speech input to the RF analog transceiver 222 is a design consideration that will be influenced by the computational capability and speed of the microprocessor 204.

Another aspect of the embodiment of the present invention is how the UAV 100 autonomously determines that two-way communications between the UAV 100 and the human operator at earth station 102 are not operational, i.e. have failed. Determining whether the digital communication channel between the UAV the earth station is operational can be integrated as part of the program controlling the operation of the system manager and hence the overall operation of UAV. For example, failure of the digital communication channel may be determined based on: a failure to receive digital communications from the earth station within a predetermined time interval; failure to receive a reply from the earth station in response to a query transmitted by the UAV within a predetermined time; failure of the RF digital transceiver 218, e.g. failure to appropriately respond to command transmitted on path 220; failure to receive a predetermined acknowledgment in response to a poll transmitted by the RF digital transceiver 218 based on instructions from the system manager; etc.

However, the two-way digital communication link between the earth station and the UAV may remain operable even though voice communications from the human operator to the controller at ATC 110 have failed. For example, even though the two-way digital communication link between the earth station and the UAV remains operable, a failure at the earth station of the microphone used by the human operator for voice communications with the ATC or a failure of the conversion of the human operator's speech from analog to digital at the earth station will cause a voice communication failure from the human operator to the ATC. Further, it is possible that a failure at the UAV can cause a voice communication failure between the human operator and the ATC even though the two-way digital communication link and the earth station are both fully functional. For example, the decoding of the received digital voice information from the human operator by the RF digital transceiver 218 into analog form may fail or the voice pass through 226 may fail causing the transmission of voice from the human operator to the ATC to fail. In order to detect such a problem, sensor 234, which is connected to the analog speech input of analog voice transceiver 222, detects the presence of analog signals and provides a signal to the system manager 202 indicating whether analog signals have been detected. The system manager 202 is informed of the reception of speech from the human operator arriving at the RF digital transceiver 218 by a corresponding speech received signal on communication line 220. Upon the system manager 202 detecting the speech received signal, the system manager monitors for the receipt of the voice present signal from sensor 234 as an indication that corresponding analog speech is being delivered to the speech input of RF analog transceiver 222. Failure of the system manager to receive the voice present signal during the presence of a speech received signal, with appropriate signal time delay anticipated, indicates a failure to supply speech information to the analog voice transceiver 222 and hence a failure of the ability of the human operator to communicate with the ATC.

Alternatively, the analog voice transceiver 222 may contain a built-in input speech detector and provide a voice present signal by communication line 224 to the system manager 202. Using a voice/speech present signal to confirm that analog speech information has actually reached the voice input of RF analog transmitter 222 provides enhanced reliability in the ability to detect that voice information from the human operator is being communicated to the ATC. In addition, the analog voice transceiver 222 can provide a RF present signal over communication line 224 to the system manager to confirm that the transceiver is actually transmitting the voice information over a corresponding RF signal. Failure of the system manager to receive the RF present signal, during times when the transceiver should be transmitting audible information to the ATC, also serves as an indication of failure to provide voice information to the ATC. Alternatively, if digital communications is operative between the human operator and the UAV but voice communications is not operative between the human operator and the UAV, the human operator can manage voice communications with the ATC, e.g. the human operator may control operation of the UAV text to speech generation.

Failure of voice communications from the ATC to the human operator is also a concern. For example, failure of the voice pass through gate 226 only in the direction from the ATC to the operator or failure of the voice processing circuitry of the RF digital transmitter 218 can result in such a failure even if the voice communications between the UAV and the ATC are operational. Sensor 236 which detects the presence of signal information at the input of the RF digital transceiver 218 provides the system manager 202 with a signal present indication and operates similar to sensor 234. Failure of this voice path can result in activation of the UAV's autonomous communication program to support "blind" communications from the UAV to the ATC. Alternatively, since the human operator still has a one-way voice path to the ATC, the human operator could choose to send voice communications to the ATC even though such communications will be "in the blind", i.e. the human operator will not be receiving voice communications from the ATC due to the failure.

Figure 3:
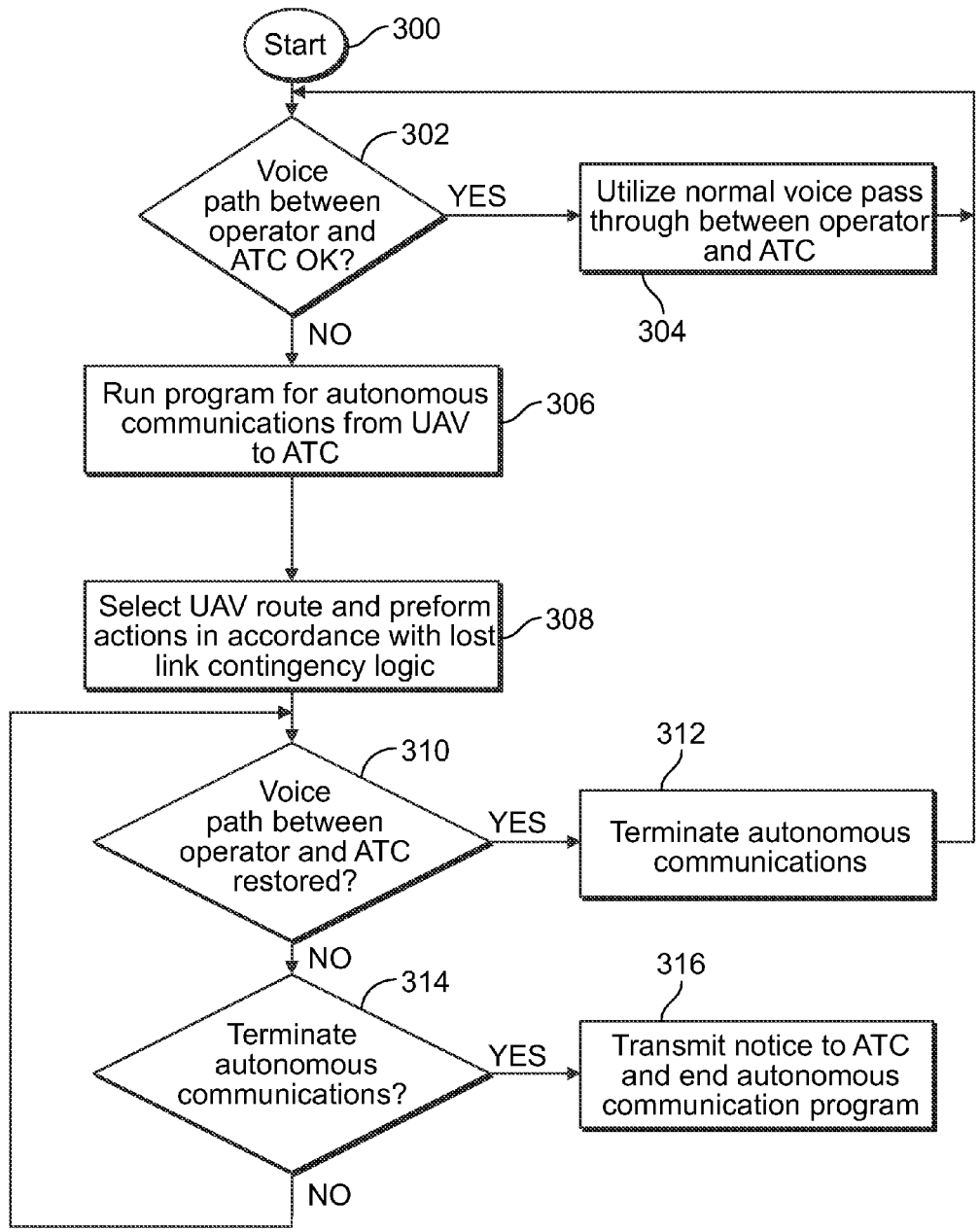
FIG. 3 is a flow diagram of an exemplary method practiced by the UAV in accordance with the present invention.

FIG. 3 shows an exemplary method in accordance with the present invention by which the UAV is capable of providing autonomous decision-making and control regarding voice communications with the ATC. It will be apparent to those skilled in the art that the illustrated method primarily addresses program control associated with autonomous decision-making and control of voice communications with the ATC. The known manner of control and operation of other functions associated with the UAV are not shown for clarity.

The exemplary method begins with Start 300. In step 302 a determination is made of whether the voice path between the human operator and the ATC is operational. A variety of sensed conditions can be used to make this determination as explained above. Alternatively, the determination may be of whether the digital path between the human operator and the UAV is operational. A YES determination by step 302, indicating that normal voice path communication between the human operator and the controller at the ATC is functional, results in step 304 causing the normal voice pass through between the human operator in the ATC to be utilized. The output of step 304 returns to the input of step 302 effectuating periodic checking of the viability of the voice path between the human operator and the ATC. A NO determination by step 302 results in step 306 causing the execution of the stored program for autonomous communications residing in memory of the UAV which controls communications sent from UAV to the ATC. In step 308 the UAV selects its route and performs actions in accordance with lost link contingency logic. This would typically include switching the transponder to code 7600, which indicates communications failure to ATC. Further details of the control of autonomous communications are described with reference to FIG. 4.

In step 310 a determination is made of whether the voice path between the human operator and the ATC has been restored, i.e. is now operational. This determination can be made as described above for step 302. Alternatively, this determination may be of whether the data path between the human operator and the UAV has been restored, i.e. is now operational. A YES determination by step 310 results in the termination of autonomous communication transmissions by the UAV. The human operator is then free to reconfigure and redirect the UAV in accordance with mission requirements. Following step 312 control returns to the input of step 302. A NO determination by step 310, indicating that the voice path between the operator and the ATC has not been restored, results in a determination by step 314 of whether to terminate autonomous communications with the ATC. For example, the UAV may be leaving airspace controlled by the ATC or the UAV may have completed its mission and landed at its base, thereby eliminating the need for further ATC communications. For this determination, the autonomous communication program receives status information from the UAV operational software associated with flight operations and mission control. A NO determination by step 314 returns control to the input of step 310. A YES determination by step 314 causes step 316 to transmit a voice notification to the ATC indicating the cessation of further autonomous communications and terminates the autonomous communication program. Once autonomous voice communications from the UAV to the ATC has been initiated, such communications continues until one of steps 310 and 314 makes a YES determination resulting in termination of autonomous communications. That is, various periodic communications are transmitted from the UAV to the ATC to assist the ATC controller in anticipating actions that will be taken by the UAV.

Figure 4:
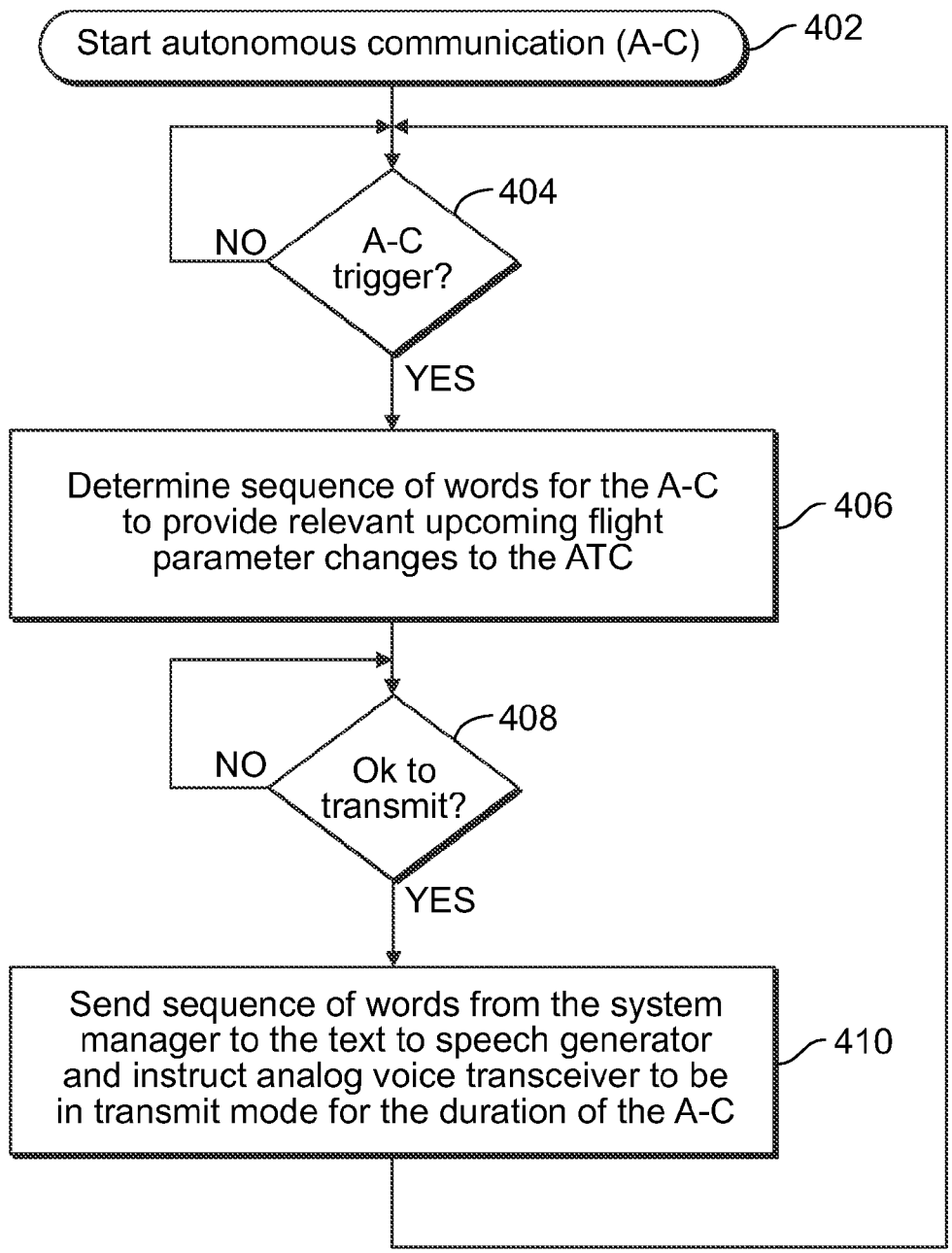
FIG. 4 is a flow diagram of an exemplary method for the generation of autonomous voice communications in accordance with the present invention.

FIG. 4 illustrates an exemplary method for the generation of autonomous voice communications (A-C) as indicated by step 308 in FIG. 3. In step 402 a determination is made to start autonomous communications. In step 404 a determination is made of whether an A-C trigger has occurred. The trigger for initiation of an A-C is determined based on the stored default flight plan and the determination of events, locations, flight parameter changes, and times associated with the execution of the default flight plan that would be helpful to communicate to the ATC, preferably prior to the execution of a change of flight parameters, e.g. heading changes, altitude changes, speed changes, destination changes, etc. The sample of such communications provided below provides specific examples of such autonomous voice communications. A NO determination by step 404 returns to the input of step 404 to await a triggering event. A YES determination by step 404 results in step 406 determining a sequence of words for the A-C that will provide relevant upcoming flight parameter changes to the ATC. This determination is made by the system manager based on a predetermined set of stored words available for selection and word selection instructions controlling the formation of sentences/phrases that will be understood by the controller at the ATC station. In step 408 a determination is made of whether it is OK to cause the RF analog transceiver to transmit. This determination is made by the system manager and may be based on no incoming voice communications on the analog voice transceiver 222, or no incoming voice communications on the analog voice transceiver 222 for a predetermined time interval, e.g. the last 10 seconds. The analog RF transceiver 222 will preferably transmit a signal by path 224 to the system manager that corresponds to whether or not incoming voice communications are being received by the RF analog transceiver. A NO determination by step 408 results in processing returning to the input of step 408 to await an appropriate time to initiate the transmission. A YES determination by step 408, indicating that it is OK to cause a transmission by the analog voice transceiver 222, causes step 410 to send a sequence of words in character format from the system manager to the text to speech generator which converts the words to an analog waveform suited for input to an analog voice input of the analog voice transceiver 222. For the duration of the A-C, the system manager instructs the analog voice transceiver 222 by a signal on path 224 to be in the transmit mode. Following the generation and transmission of a particular A-C at the end of step 410, process returns to the input of step 404 to await a further A-C trigger event.

The following sequence of illustrative communications provides a sample of communications between the UAV and the ATC including autonomous communications ("UAV voice") from the UAV of exemplary flight parameters. At the beginning of this example, the digital communication link to the ground control station is operative and communications exists between the human operator and the ATC controller. The transponder of the UAV is squawking an assigned code indicative of radio communications with the ATC.

\*\*\*Start Sample A-C\*\*\*

Human operator voice: Joshua control [the controlling ATC], Hawk 252 [identification code of the UAV] is with you above FL500[50,000 feet].

ATC: Hawk 252, Roger.

The digital communication link between the ground station the UAV fails. The UAV transitions to a stored program for a lost communication contingency mission plan and activates autonomous communication program. The UAV sets transponder code to 7600 indicating no radio communications with ATC.]

UAV voice: Hawk 252 level above FL500, transmitting in the blind. This UAV has lost link with its ground control station and is unable to comply with ATC direction. This UAV will continue on current course and altitude for the next 2 minutes.

UAV voice: Hawk 252 transmitting in the blind. In 30 seconds, this UAV will turn right to heading 235. This UAV will hold 5 nautical miles north of the Edwards TACAN, descend to FL270 and proceed on approach to Palmdale runway 25.

UAV voice: Hawk 252 transmitting the blind. This UAV is holding 5 nautical miles North of Edwards TACAN. In 1 minute will be leaving FL500 for FL270. Expect arrival at Palmdale runway 25 at 1805 Zulu.

[On descending below FL500, the UAV activates transponder mode to provide altitude to controllers by ATC radar.]

UAV voice: Hawk 252 transmitting in the blind. In 2 minutes, this UAV will turn south, descend to 15,000 feet, and initiate approach to Palmdale runway 25.

UAV voice: Hawk 252 transmitting the blind. Leaving 15,000 feet for 10,000 feet. Turning right heading 251 to join the RNAV approach to Palmdale runway 25. Expected arrival 1804 Zulu. In 1 minute this is UAV will change ATC frequency to 317.6 MHz.

UAV voice: Hawk 252 transmitting in the blind. Leaving 14,000 feet for 10,000 feet. Now switching to 317.6 MHz. [Palmdale tower frequency]

UAV voice: [now transmitting on 317.6 MHz] Hawk 252 leaving 13,500 feet for 10,000 feet, transmitting in the blind. This UAV has lost link with its ground control station and is unable to comply with ATC direction. This UAV is executing the RNAV approach to Palmdale runway 25. Expected arrival 1804 Zulu.

UAV voice: Hawk 252 transmitting in the blind. 10,000 feet, 15 mile final approach to Palmdale runway 25.

UAV voice: Hawk 252 transmitting in the blind. 4,900 feet, 4 mile final approach to Palmdale runway 25. This UAV will make no further transmissions.

[UAV Lands.]

*End Sample A-C*

Autonomous voice communications from the UAV to the ATC can be implemented to cover contingencies other than loss of voice communications with the human operator. For example, a loss of engine or a loss of sufficient electrical power generation will cause the UAV to transition to other appropriate stored contingency mission plans dependent upon the particular contingency. The UAV by autonomous voice announcement can inform the ATC of the nature of the contingency and continue to announce flight actions prior to taking such actions in order to give the controller at the ATC time to alter or divert, if needed, the flight path of other aircraft in view of the inability of the ATC to control flight actions by the UAV.

Although exemplary implementations of the invention have been depicted and described in herein, it will be apparent to those skilled in the art that various modifications, additions, substitutions, and the like can be made without departing from the spirit of the invention. The scope of the invention is defined in the following claims.

I claim:

1. A method implemented by an unmanned air vehicle (UAV) for providing voice communications to an air traffic control (ATC) station comprising the steps of:

supporting two-way first voice communications with a human operator at a control station that is in control of the UAV over a digital radio frequency (RF) link and two-way second voice communications with a controller at the ATC station over an analog RF link;

coupling the first and second voice communications to each other so that two-way voice communications are provided between the human operator and the controller; determining that the first communications with the human operator is not operative;

based on said determination, generating autonomous voice announcements of flight parameters of the UAV, and transmitting the autonomous voice announcements via the analog radio frequency link to the ATC station;

determining that the first communications with the human operator, which was not operative, has now become operative; and ceasing the generation of autonomous voice announcements of flight parameters of the UAV based on the first communications with the human operator now being operative.

2. The method of claim 1 wherein the step of determining comprises sensing that the digital RF link is not operative.

3. The method of claim 2 wherein the autonomous voice announcements generated by the UAV are based on current flight parameters autonomously determined by the UAV in combination with information about a predetermined flight plan stored in memory of the UAV which controls the flight of the UAV upon the digital RF link becoming inoperative.

4. The method of claim 1 further comprising the steps of:
determining a sequence of words to be used for one autonomous voice announcement where the words are stored in memory of the UAV in character format; and
converting the words in the sequence of words from character format to a waveform format suitable for transmission over the analog RF link.

5. The method of claim 1 wherein the two-way first voice communications is with the human operator at an earth-based control center station that is not at the same location as the ATC.

6. A method implemented by an unmanned air vehicle (UAV) for providing voice communications to an air traffic control (ATC) station comprising the steps of:

supporting two-way first voice communications with a human operator at a control station that is in control of the UAV over a digital radio frequency (RF) link and two-way second voice communications with a controller at the ATC station over an analog RF link;

coupling the first and second voice communications to each other so that two-way voice communications are provided between the human operator and the controller;

determining that the first communications with the human operator is not operative by sensing that the first voice communications received from the human operator are not being coupled to the second voice communications to be transmitted to the ATC station; and based on said determination, generating autonomous voice announcements of flight parameters of the UAV, and transmitting the autonomous voice announcements via the analog radio frequency link to the ATC station.

7. A computer program product, comprising a tangible non-transitory medium having a computer readable program code embodied therein, said computer readable program code adapted to be executed by a computer in an unmanned air vehicle (UAV) to implement a method for providing voice communications to an air traffic control (ATC) station, said method comprising;
    supporting two-way first voice communications with a human operator at a control station that is in control of the UAV over a digital radio frequency (RF) link and two-way second voice communications with a controller at the ATC station over an analog RF link;
    coupling the first and second voice communications to each other so that two-way voice communications are provided between the human operator and the controller;
    determining that the first communications with the human operator is not operative;
    based on said determination, generating autonomous voice announcements of flight parameters of the UAV, and transmitting the autonomous voice announcements via the analog radio frequency link to the ATC station;
    determining that the first communications with the human operator, which was not operative, has now become operative; and
    ceasing the generation of autonomous voice announcements of flight parameters of the UAV based on the first communications with the human operator now being operative.

8. The computer program product of claim 7 wherein the step of determining comprises sensing that the digital RF link is not operative.

9. The computer program product of claim 8 wherein the autonomous voice announcements generated by the UAV are based on current flight parameters autonomously determined by the UAV in combination with information about a predetermined flight plan stored in memory of the UAV which controls the flight of the UAV upon the digital RF link becoming inoperative.

10. The computer program product of claim 7 wherein the method further comprises the steps of:
    determining a sequence of words to be used for one autonomous voice announcement where the words are stored in memory of the UAV in character format; and
    converting the words in the sequence of words from character format to a waveform format suitable for transmission over the analog RF link.

11. A computer program product, comprising a tangible non-transitory medium having a computer readable program code embodied therein, said computer readable program code adapted to be executed by a computer in an unmanned air vehicle (UAV) to implement a method for providing voice communications to an air traffic control (ATC) station, said method comprising:
    supporting two-way first voice communications with a human operator at a control station that is in control of the UAV over a digital radio frequency (RF) link and two-way second voice communications with a controller at the ATC station over an analog RF link;
    coupling the first and second voice communications to each other so that two-way voice communications are provided between the human operator and the controller;
    determining that the first communications with the human operator is not operative by sensing that the first voice communications received from the human operator are not being coupled to the second voice communications to be transmitted to the ATC station; and
    based on said determination, generating autonomous voice announcements of flight parameters of the UAV, and transmitting the autonomous voice announcements via the analog radio frequency link to the ATC station.

12. An unmanned air vehicle (UAV) that provides voice communications to an air traffic control (ATC) station comprising:
    a digital radio frequency (RF) transceiver that supports two-way first voice communications with a human operator at a control station that is in control of the UAV over a digital radio frequency (RF) link;
    an analog voice transceiver that supports two-way second voice communications with a controller at the ATC station over an analog RF link;
    a voice pass through transmission gate couples the first and second voice communications to each other so that two-way voice communications are provided between the human operator and the controller;
    a computer controlled system manager that controls the operation of the UAV;
    a sensor mechanism provides an input to the computer controlled system manager that determines, based on the input, that the first communications with the human operator is not operative;
    based on said determination, the computer controlled system manager controlling the generation of autonomous voice announcements of UAV flight parameters, and controlling the analog RF transceiver to transmit the autonomous voice announcements via the analog RF link to the ATC station;
    the system manager determining that the first communications with the human operator, which was not operative, has now become operative; and
    the system manager ceasing the generation of autonomous voice announcements of flight parameters of the UAV based on the first communications with the human operator now being operative.

13. The UAV of claim 12 wherein the input indicates that the digital RF link is not operative.

14. The UAV of claim 13 wherein the autonomous voice announcements generated by the UAV are based on current flight parameters autonomously determined by the system manager in combination with information about a predetermined flight plan stored in memory of the system manager which controls the flight of the UAV upon the digital RF link becoming inoperative.

15. The UAV of claim 12 further comprising:
    the system manager determining a sequence of words to be used for one autonomous voice announcement where the words are stored in memory of the system manager in character format; and
    a text to speech generator, which receives the sequence of words in character format from the system manager, converts the sequence of words from character format to an analog waveform format and conveys the waveform format of the words to a voice input of the analog RF transceiver for transmission to the ATC station.

16. The UAV of claim 12 wherein the two-way first voice communications is with the human operator at an earth-based control center station that is not at the same location as the ATC.

17. An unmanned air vehicle (UAV) that provides voice communications to an air traffic control (ATC) station comprising:
    a digital radio frequency (RF) transceiver that supports two-way first voice communications with a human operator at a control station that is in control of the UAV over a digital radio frequency (RF) link;

an analog voice transceiver that supports two-way second voice communications with a controller at the ATC station over an analog RF link;

a voice pass through transmission gate couples the first and second voice communications to each other so that two-way voice communications are provided between the human operator and the controller;

a computer controlled system manager that controls the operation of the UAV;

a sensor mechanism provides an input to the computer controlled system manager that determines, based on the input, that the first communications with the human operator is not operative where the input indicates that the first voice communications received from the human operator are not being coupled to the second voice communications to be transmitted to the ATC station; and based on said determination, the computer controlled system manager controlling the generation of autonomous voice announcements of UAV flight parameters, and controlling the analog RF transceiver to transmit the autonomous voice announcements via the analog RF link to the ATC station.

\* \* \* \* \*